United States Patent
Baatz et al.

(10) Patent No.: US 6,832,002 B2
(45) Date of Patent: Dec. 14, 2004

(54) METHOD OF ITERATIVE SEGMENTATION OF A DIGITAL PICTURE

(75) Inventors: Martin Baatz, Munich (DE); Gerd Binnig, Wollerau (CH); Peter Eschenbacher, Neunkirchen (DE); Andreas Melchinger, Lonsee (DE); Michael Sogtrop, Poing (DE)

(73) Assignee: Definiens AG, Munich (DE)

( * ) Notice: Subject to any disclaimer, the term of this patent is extended or adjusted under 35 U.S.C. 154(b) by 666 days.

(21) Appl. No.: 09/818,299

(22) Filed: Mar. 26, 2001

(65) Prior Publication Data

US 2001/0055421 A1 Dec. 27, 2001

Related U.S. Application Data

(63) Continuation-in-part of application No. 09/023,670, filed on Feb. 10, 1998, now abandoned.

(30) Foreign Application Priority Data

Feb. 10, 1997 (DE) .......................................... 197 05 017

(51) Int. Cl.$^7$ ................................................ G06K 9/00
(52) U.S. Cl. ..................................... 382/173; 382/171
(58) Field of Search .............................. 382/164, 171, 382/173, 180, 225, 226; 358/462–466

(56) References Cited

U.S. PATENT DOCUMENTS

| | | | | |
|---|---|---|---|---|
| 4,945,478 A | * | 7/1990 | Merickel et al. | ............ 382/131 |
| 5,748,761 A | * | 5/1998 | Chang et al. | ................ 382/107 |
| 5,787,194 A | * | 7/1998 | Yair | ............................ 382/173 |
| 5,790,692 A | * | 8/1998 | Price et al. | .................. 382/133 |
| 5,796,862 A | * | 8/1998 | Pawlicki et al. | ............. 382/132 |
| 5,995,668 A | * | 11/1999 | Corset et al. | ................ 382/233 |

OTHER PUBLICATIONS

Tilton et al "Hybrid Image Segmentation for Earth Remote Sensing Data Analysis", IEEE International, vol. 1, pp 703–705, 199.*

* cited by examiner

*Primary Examiner*—Yon Couso
(74) *Attorney, Agent, or Firm*—Blakely Sokoloff Taylor & Zafman

(57) ABSTRACT

The present invention relates to a method for segmentation of a digital picture consisting of a multiplicity of single picture elements comprising determining if one of one and several features relating to contiguous picture objects comprising picture elements and picture segments are conforming or not conforming based on a specific homogeneity criterion by means of referencing a predetermined tolerance for each feature as a termination criterion, within which feature values relating to the contiguous picture objects in question may differ; if one of one feature and several features relating to the contiguous picture objects are determined to be conforming then merging the conforming picture objects; and repeating the resulting segmentation until the resulting segmentation converges in a stable or approximately stable condition in which no further contiguous picture objects are determined to be conforming.

38 Claims, 10 Drawing Sheets

0            GRAY VALUES            256

METHOD OF ITERATIVE SEGMENTATION OF A DIGITAL PICTURE

CROSS REFERENCE TO RELATED APPLICATIONS

This application is a continuation-in-part of U.S. patent application Ser. No. 09/023,670, filed Feb. 10, 1998, abandoned.

BACKGROUND OF THE INVENTION

1. Field of the Invention

The present invention relates to a method for segmentation of a digital picture consisting of a multiplicity of single picture elements which is in particular suitable for digital picture processing and/or object and pattern recognition.

2. Description of the Prior Art

In most fields of application of digital picture processing and pattern recognition it is necessary to recognize and classify pertinent structures in a picture consisting of a multiplicity of single picture elements. An important step therefore consists in combining pertinent, contiguous picture elements into coherent picture segments. This technique is referred to as segmentation. Through their shape and texture properties the picture segments thereby found offer substantially more information for a subsequent classification than single picture elements, with this information being strongly dependent on the quality of segmentation.

The essential criteria for the segmentation of picture elements are contiguity and so-called homogeneity criteria which determine whether or not a picture segment, following the combination of picture elements, is judged to be homogeneous. A homogeneity criterion determines whether or not combination is performed. In a homogeneity criterion for example specific texture properties or a homogeneity of features can be defined.

One particular difficulty in segmentation of a picture is caused by the texture of picture regions which occurs in very many pictures in most variegated degrees. Characteristically, almost all object types are more or less textured. A like texture is, besides other properties for example seediness or grain, essentially characterized by a higher or lower degree of distribution of features, for example a gray value distribution or color distribution. Such distributions of feature values may be greater or smaller for various objects and may also overlap.

For example in FIG. 17 a case is represented wherein altogether six picture objects each presenting a differently sized range of gray values ranging on a scale between 0 and 256 are shown, wherein the respective range of gray values of the picture objects represented above partly or entirely overlaps with the one of the picture objects represented below.

This causes considerable difficulties in segmentation as on the one hand, textured picture objects, which in part present very different feature values, are to be segmented entirely, whereas on the other hand segmentation is performed as a general rule on the basis of similarities of features. Where the differences of features within an picture object are too large, segmentation will become problematic owing to similarity of features. At the same time it is generally difficult to separate two contiguous picture objects having overlapping feature distributions.

In many segmentation methods of the prior art the similarity or pertinence of picture elements and picture segments is determined for example by means of so-called one- or more-dimensional threshold techniques, wherein the feature space defined by the features of the picture elements is classified into partial ranges. The homogeneity criterion is satisfied in these known methods whenever the picture elements are contained in a same partial range. Thus for example the 256 gradations of gray in which a digitized picture is frequently present, may be classified into 16 regions each having 16 gray values. If two contiguous picture elements are in a same range of gray values, they are judged to be similar and are therefore segmented. This does, however, often solve the above described difficulties only very insufficiently. Even where certain objects are well described by the classification of the regions, this classification may fail altogether for other picture objects.

Other methods attempt to combine picture segments based on specific predetermined texture features which leads to a texture-based segmentation. This works more or less well for specific textures in particular picture regions, however often worse in other picture regions. These methods at the same time necessitate beforehand knowledge about the picture and its textures, and furthermore do not enable any desired resolutions.

Segmentation methods utilizing watershed transformation employ as the basis for segmentation a representation of the color gradients in the picture, begin segmentation in the most homogeneous picture regions, and successively, i.e. by and by, expand the segments into more heterogeneous picture regions. In this way homogeneous picture regions are well segmentable, uniformly heterogeneous picture regions however with more difficulty. Simultaneous segmentation of homogeneous and heterogeneous picture regions, or of picture regions having different degrees of heterogeneity, can be performed only with great difficulty. In addition the method disregards the original color information.

Techniques performing pixel classification operate along the principle of determining, based on beforehand knowledge, intervals or distributions in the feature space which are known to be characteristic for particular object classes. In this case the examined picture elements are each allocated to a respective class with which they present the highest probability of pertinence in accordance with their vector in the feature space. The homogeneity criterion is in this case defined as pertinence to the same object class. Apart from the fact that much less information for classification is available about single picture elements than about picture segments, a particular difficulty is encountered in processing aerial and satellite pictures owing to the fact that the distribution of the features for particular object types depends very strongly on weather, time of the day and season, as well as light conditions at the time when the picture was taken. Accordingly a suitable preliminary definition of typical distributions for particular object classes in the feature space is very difficult.

From the article J. C. Tilton: "HYBRID SEGMENTATION FOR EARTH REMOTE SENSING DATA ANALYSIS", IEEE International, vol. 1, pp. 703 to 705, there is known a method for segmentation of a digital picture which uses a combination of region growing and boundary detection. In a first step of this method edge boundaries are detected and in a second step of this method region growing is performed by not allowing to grow regions past edge boundaries defined by the boundary detection. However, this method has disadvantages in that the maximum size of regions to be grown is the size defined by the edge boundaries. Thus, this method fails to provide the possibility to grow regions having similar features past edge boundaries which are in fact no edges of different picture objects but result from textures or the like.

SUMMARY OF THE INVENTION

It is therefore one object of the present invention to provide a method for segmentation of a digital picture which ensures an excellent segmentation or object recognition even in cases where respective objects have overlapping feature ranges or are characterized by feature values which are liable to strongly vary under different conditions.

In accordance with a first aspect of the present invention there is provided a method for segmentation of a digital picture consisting of a multiplicity of single picture elements comprising (a) determining if one of one and several features relating to contiguous picture objects comprising picture elements and picture segments are conforming or not conforming based on a specific homogeneity criterion by means of referencing a predetermined tolerance for each feature as a termination criterion, within which feature values relating to the contiguous picture objects in question may differ; (b) if one of one feature and several features relating to the contiguous picture objects are determined to be conforming then merging the conforming picture objects; and (c) repeating the resulting segmentation until the resulting segmentation converges in a stable or approximately stable condition in which no further contiguous picture objects are determined to be conforming.

In a preferred embodiment of the present invention a feature difference to be compared in the homogeneity criterion is determined via heterogeneity introduced by merging two picture objects by determining a difference $\Delta h_w$ between heterogeneities of respective picture objects weighted with the size of the respective picture objects after and before merging so that homogeneity is expressed by the formula $$\Delta h_w = (n_1+n_2)h_{new} - (n_1 h_1 + n_2 h_2) < \alpha$$

wherein $\alpha$ is the predetermined tolerance, $h_1$ and $h_2$ are heterogeneities of the respective picture objects, $n_1$ and $n2$ are sizes of the respective picture objects and $h_{new}$ is the heterogeneity of a potentially newly formed picture object.

In a further preferred embodiment of the present invention the heterogeneity of the potentially newly formed picture object is defined as standard deviation of color mean values of the respective picture objects as expressed by the formula $$\Delta h_w = \Delta \sigma_w = (n_1+n_2)\sigma_{new} - (n_1 \sigma_1 + n_2 \sigma_2) < \alpha$$

wherein $\sigma_1$ and $\sigma_2$ are standard deviations of the respective picture objects and $\sigma_{new}$ is the standard deviation of the potentially newly formed picture object.

In a further preferred embodiment of the present invention a predetermined value for the standard deviation is used for small picture objects having a size of approximately one to five picture elements.

In a further preferred embodiment of the present invention the heterogeneity of the potentially newly formed picture object is defined as the variance of color mean values of the respective picture objects as expressed by the formula $$\Delta h_w = \Delta var_w = (n_1+n_2)var_{new} - (n_1 var_1 + n_2 var_2) < \alpha$$

wherein $var_1$ and $var2$ are variances of the respective picture objects and $var_{new}$ is the variance of the potentially newly formed picture object.

In a further preferred embodiment of the present invention the heterogeneity of a potentially newly formed picture object is determined via a weighted difference of color mean values of the respective picture objects before and after merging as expressed by the formula $$\Delta h_w = \Delta m_w = (n_1+n_2)|m_{new}| - (n_1|m_1| + n_2|m_2|) < \alpha$$

wherein $m_1$ and $m_2$ are color mean values of the respective picture objects and $m_{new}$ is the color mean value of the potentially newly formed picture object.

In a further preferred embodiment of the present invention picture regions having continuous color transitions are combined and the heterogeneity of the potentially newly formed picture object is defined as one of the average distance and the average value of the squares of the distances of the color mean values of the respective picture objects depending on the dimensionality of the topical space in relation to a regression line, surface or hypersurface of the color mean values in the topical space or in relation to another function of approximation to the color mean values in the topical space.

In a further preferred embodiment of the present invention after step (c) the steps of (d) determining if a new tolerance is selected; and (e) if a new tolerance is selected then repeating the method for segmentation and returning to step (a) to thereby form a hierarchical structure of picture objects having different hierarchy planes, are performed.

In a further preferred embodiment of the present invention on a lowest hierarchy plane of the hierarchical structure picture elements are located, which are then at least on a next higher hierarchy plane of the hierarchical structure merged into over-picture objects, which may in turn be merged once or several times into over-picture objects on higher hierarchy planes of the hierarchical structure.

In a further preferred embodiment of the present invention the highest hierarchy plane of the hierarchical structure contains only one picture object.

In a further preferred embodiment of the present invention a new hierarchy plane is introduced in the hierarchical structure by initially duplicating all picture objects on a next lower hierarchy plane and inserting these picture objects in the new hierarchy plane as respective over-picture objects of the picture objects on the next lower hierarchy plane, wherein the picture objects on the new hierarchy plane which are determined to be conforming are merged in such a manner that only picture objects are merged which do not have different over-picture objects on a next higher hierarchy plane.

In a further preferred embodiment of the present invention an order in which picture objects of a plane are processed is an order which ensures a maximum possible distance from already processed picture objects and is a pseudo-stochastic order wherein in multiple, repeated runs on a hierarchical plane within one run each picture object present at the beginning of the run is processed once at the most by merging.

In a further preferred embodiment of the present invention the method further comprises the steps of (f) determining if one of one and several features of already merged picture objects are still conforming or not still conforming based on the specific homogeneity criterion; and (g) if one of one feature and several features of the already merged picture objects are determined not to be still conforming then excluding the not still conforming picture objects.

In a further preferred embodiment of the present invention steps (f) and (g) are performed in addition to steps (a) and (b) in an arbitrary order or in parallel.

In a further preferred embodiment of the present invention the method further comprises the steps of (h) determining if a boundary picture object of already merged picture objects located at a boundary of the already merged picture objects satisfies the homogeneity criterion with the already merged picture objects as well as with one of one and several contiguous picture objects; and (i) if the homogeneity criterion is satisfied with the already merged picture objects as well as with the one of one and several contiguous picture objects, allocating the boundary picture object to the picture object with which the homogeneity criterion is satisfied best.

In a further preferred embodiment of the present invention steps (h) and (i) are performed in addition to at least one of steps (a) and (b) and steps (f) and (g) in an arbitrary order or in parallel.

In a further preferred embodiment of the present invention if the homogeneity criterion is satisfied with the already merged picture objects as well as with the one of one and several contiguous picture objects, feature distributions of the already merged picture objects and the one of one and several contiguous picture objects are calculated and based thereon, a pertinence of the boundary picture object is determined in such a manner that the boundary picture object is allocated to the one picture object wherein a feature value of the boundary picture object occurs most frequently or that the boundary picture object is allocated to a picture object in a probabilistic manner by calculating probabilities based on a frequency of occurrence of the feature value of the boundary picture object in the already merged picture objects and the one of one and several contiguous picture objects.

In a further preferred embodiment of the present invention for the feature distributions respective histograms of the features of the already merged picture objects and the one of one and several contiguous picture objects are referred to.

In a further preferred embodiment of the present invention if a boundary picture object is re-grouped from one picture object into another picture object, coherence of the one picture object is examined and in case of non-coherence of the one picture object the one picture object is divided into corresponding coherent picture objects formed by re-grouping.

In a further preferred embodiment of the present invention the digital picture comprises a plurality of single channels having a different information content and boundary picture objects are regrouped from one picture object into another picture object only if the pertinence to the other picture object averaged through all single channels is greater than the pertinence to the one picture object averaged through all single channels.

In a further preferred embodiment of the present invention in merging or boundary correction object-related various homogeneity criteria are employed in accordance with specific features of the picture objects comprising compactness, size, boundary roughness, linearity, gradient of color development, and their classification.

In a further preferred embodiment of the present invention merging is performed only if a feature difference defined in the homogeneity criterion for one of the picture objects is smallest in comparison with the contiguous picture objects and contained within the predetermined tolerance.

In a further preferred embodiment of the present invention merging is performed only if for two picture objects a feature difference defined in the homogeneity criterion is smallest in comparison with the other contiguous picture objects and is contained within the predetermined tolerance.

In a further preferred embodiment of the present invention merging is performed only if a feature difference defined in the homogeneity criterion is smallest in comparison with all other possible combinations of picture objects and is contained within the predetermined tolerance.

In a further preferred embodiment of the present invention picture objects are processed in a pseudo-stochastic order.

In a further preferred embodiment of the present invention picture objects are processed in an order which ensures maximal possible distance from already processed picture objects.

In a further preferred embodiment of the present invention several picture objects are processed simultaneously.

In a further preferred embodiment of the present invention the digital picture comprises a plurality of single channels having a different information content and picture objects are combined only if the homogeneity criterion referred to is satisfied for each one of the channels.

In a further preferred embodiment of the present invention the digital picture comprises a plurality of single channels having a different information content and wherein for the homogeneity criterion standard deviations, variances or mean values of color values of picture objects are added up or averaged through all channels, wherein the channels may be weighted differently.

In a further preferred embodiment of the present invention boundary picture objects are not referred to for determination of properties of large picture objects.

In a further preferred embodiment of the present invention the homogeneity criterion comprises texture features.

In a further preferred embodiment of the present invention a segmentation of lines is performed in which a value of linearity indicating a ratio of length and width of a picture object is used as a shape feature and picture objects are initially segmented such that each picture object exceeding a threshold for the value of linearity is processed as a line object.

In a further preferred embodiment of the present invention processing of a picture object as a line object comprises the steps of searching for picture objects matching picture objects complementing a line in a direction of line ends beyond an immediate vicinity as far as a specific distance and in a sector having a specific angle; determining a factor which improves a matching value determined in the homogeneity criterion depending on how well a line is complemented by a previous line object, so that in case of an identical matching value linear combination is preferred to the usual combination; determining criteria for how well a line is complemented, such as an improvement of the linearity of the previous line object, in addition to at least one of identical color contrast with the surroundings and identical color; and establishing a connection having a minimum possible thickness between non-contiguous picture objects such that the line object is in any case diagonally coherent, if a matching picture object is not found in the immediate vicinity.

In a further preferred embodiment of the present invention upon additionally performing linear segmentation, segmentation is initially performed with diagonal vicinity, wherein small and linear picture objects have diagonal coherence and all other picture objects have planar coherence, wherein, if a hitherto small, diagonally picture object exceeds a critical size or if a hitherto linear picture object drops below a critical linearity by area merging, it is divided into its components having planar coherence.

In accordance with a second aspect of the present invention there is provided a method for segmentation of a digital picture consisting of a multiplicity of single picture elements comprising (a) determining if one of one and several features relating to contiguous picture objects comprising picture elements and picture segments are conforming or not conforming based on a specific homogeneity criterion by means of determining a modification of the contiguous picture objects in question as a continuation criterion which leads to a minimum increase in a defined value for the complexity of an entire structure consisting of all picture objects; (b) if one of one feature and several features relating to the contiguous picture objects are determined to be conforming then combining the conforming picture objects; and (c) repeating the resulting segmentation until the resulting segmentation converges in a stable or approximately stable condition in which no further contiguous picture objects are determined to be conforming.

In a further preferred embodiment of the present invention by means of repeating the resulting segmentation a hierarchical structure is formed having several hierarchical planes which are present in a locally different hierarchical depth.

In a further preferred embodiment of the present invention a highest hierarchical plane consists of a single picture object containing all picture elements.

In a further preferred embodiment of the present invention respective modifications are performed on respective highest local hierarchical planes of the hierarchical structure.

In a further preferred embodiment of the present invention the modifications comprise at least one of merging two contiguous picture objects, exclusion of a picture object from another picture object, allocating a boundary picture object located at the boundary of already merged picture objects to another contiguous picture object and founding a new picture object on a next higher local hierarchical plane to be formed.

In a further preferred embodiment of the present invention the defined value for the complexity is defined as one of the sum through all picture objects in the hierarchical structure of standard deviations of color mean values of objects multiplied by the number of picture objects on a next lower hierarchical plane in each picture object $$C = {}_i \sigma_{U dir} n_{i_{U dir}}$$

wherein C is the defined value for the complexity, $\sigma_{i_{U dir}}$ is the standard deviation of the color mean value of a respective picture object i, and $n_{i_{U dir}}$ is the number of the picture objects on the next lower hierarchical plane in each picture object, and the sum through all picture objects in the hierarchical structure of variances of color mean values of the picture objects on the next lower hierarchical plane in each picture object multiplied by the number of picture objects on the next lower hierarchical plane in each picture object $$C = {}_i \text{var}_{U dir} n_{i_{U dir}}$$

wherein C is the defined value for the complexity, $\text{var}_{i_{U dir}}$ is the variance of the color mean value of a respective picture object i, and $n_{i_{U dir}}$ is the number of the picture objects on the next lower hierarchical plane in each picture object.

BRIEF DESCRIPTION OF THE DRAWINGS

These and other aspects of the present invention will be apparent from and elucidated with reference to the embodiments described hereinafter and considered in connection with the accompanying drawings, in which.

DETAILED DESCRIPTION OF THE INVENTION

First of all, it should be noted that the term "digital picture" as used herein should be understood to signify a digital data record having any dimensionality to be segmented and the term "picture element" should be understood to signify a smallest single element contained in this data record, such as for example a pixel or a voxel. Furthermore, it should be noted that the term "picture object" as used herein should be understood to jointly signify a picture element or a picture segment and that a picture segment may equally contain a single picture element.

It should be noted that the present invention is applicable on a digital picture consisting of a multiplicity of single picture elements. The method of the present invention can be applied on a digital picture which has not been processed before and thus contains only picture elements as picture objects as well as on a digital picture which has been processed before and thus contains picture elements as well as picture segments as picture objects, to thereby again process the digital picture under different conditions or the like. The fundamental functional principle of the present invention is to process contiguous picture objects, i.e. picture elements or picture segments, which are determined to be conforming based on a homogeneity criterion for one or several features relating to contiguous picture objects. Processing of picture objects includes merging of picture objects and some other possibilities of processing picture objects as will be described below in more detail.

Figure 1:
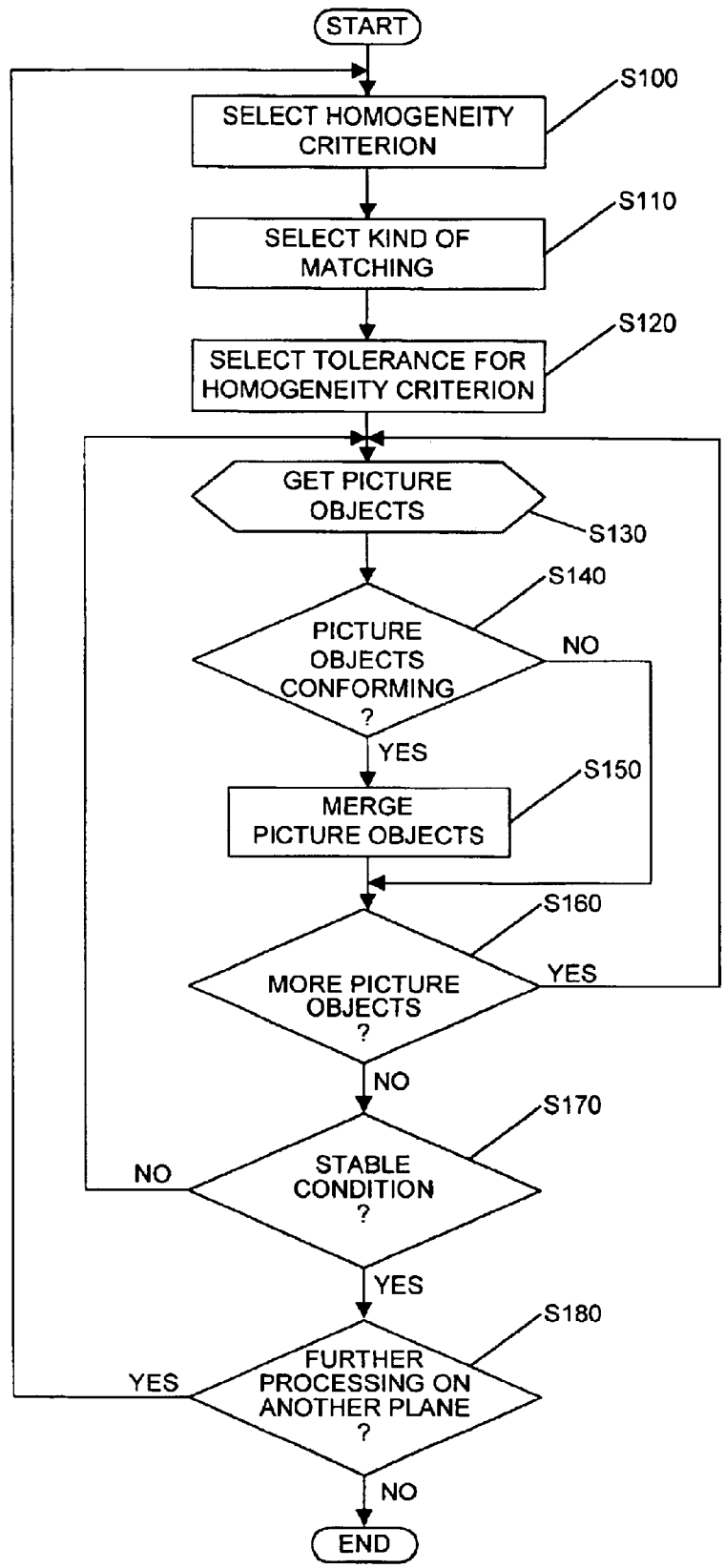
FIG. 1 illustrates a flow chart of a method for segmentation of a digital picture in accordance with an embodiment of the present invention.

Referring now to FIG. 1, there is illustrated a flow chart of a method for segmentation of a digital picture in accordance with an embodiment of the present invention.

In the first step S100 a homogeneity criterion is selected. Such homogeneity criterion defines the condition under which it is determined whether one or several features relating to contiguous picture objects are conforming or not conforming. In the next step S110 a kind of matching is selected. This means that it is selected whether the homogeneity criterion should be applied to contiguous picture objects by means of using simple matching, best matching, mutual best matching or global best matching. In the next step S120 a tolerance for the homogeneity criterion is selected. In more detail, the tolerance of the homogeneity criterion is referenced for each feature of contiguous picture objects as a termination criterion within which feature values relating to contiguous picture objects may differ.

Details of the homogeneity criterion, the kind of matching and the tolerance for the homogeneity criterion will now be described. There are various possibilities which do, however, all take into consideration the specific distribution of features or other properties such as the size of picture objects, texture, shape, orientation or the like.

In general, two different types of homogeneity criteria are used to determine a difference between feature values of contiguous picture objects. In the first type of homogeneity criteria, the difference in feature values between two contiguous picture objects is compared directly. In the second type of homogeneity criteria, a potential condition of two contiguous picture objects after merging is compared with the condition before merging to thereby determine the heterogeneity introduced by a facultative combination. Thus, it is possible to deduct the difference between feature values of the two contiguous picture objects.

In the following, the first type of homogeneity criteria will be described in further detail.

In the most simple case, the color mean value in accordance with the following inequation (1) enters in the homogeneity criterion which describes the conformity or similarity of two contiguous picture objects 1 and 2.

$$|m_1 - m_2| < \alpha \quad (1)$$

In inequation (1) $\alpha$ designates a predetermined factor globally determining the tolerance for each feature relating to contiguous picture objects for the entire digital picture and $m_1$ and $m_2$ designate color mean values of the two contiguous picture objects 1 and 2. Inequation (1) specifies that the difference of the color mean values $m_1$ and $m_2$ must be smaller than a globally predetermined tolerance, i.e. the value $\alpha$.

The accuracy of segmentation can be further improved if the homogeneity criterion of inequation (1) is modified in such a way that in addition the standard deviation of feature distributions of the two contiguous picture objects is taken into consideration, as can be seen from the following inequation (2).

$$\frac{|m_1 - m_2|}{\sigma_1 + \sigma_2} < \alpha \quad (2)$$

In inequation (2) $\alpha$ again designates the tolerance, $\sigma_1$ and $\sigma_2$ designate standard deviations of the two contiguous picture objects 1 and 2 and $m_1$ and $m_2$ again designate color mean values of the two contiguous picture objects 1 and 2. Inequation (1) specifies that the difference of the color mean values $m_1$ and $m_2$, divided by the sum of the standard deviations $\sigma_1$ and $\sigma_2$, must be smaller than the globally predetermined tolerance, i.e. the value $\alpha$. The standard deviations $\sigma_1$ and $\sigma_2$ establish a local object relations which leads thereto that, the more heterogeneous the two contiguous picture objects 1 and 2 already are, the more tolerantly the difference in the color mean values $m_1$ and $m_2$ is evaluated.

As small picture objects of approximately 1 to 5 picture elements do not have, or do not yet have, a representative standard deviation, a specific standard deviation can instead be used for such small picture objects. The specific standard deviation for such small picture objects can be set to a predetermined value or can also be derived for example from the standard deviation of the entire digital picture or from a corresponding context.

Furthermore, the merging of two contiguous picture objects depends on current properties of the two contiguous picture objects and thus on the degree in which the two contiguous picture objects have already been segmented. Namely, the homogeneity criterion in accordance with inequation (1) or (2) also signifies that the similarity of a picture object with another one will always change with its current composition. In other words, the segmentation in a method which repeatedly redefines the properties in relation to an object is a historical method. Starting with a picture object by successively merging with other picture objects changes the properties of the thus formed new picture object and thus the conditions for merging with a next following picture object. Hence, whether or not a particular picture object is merged with another particular picture object depends on what properties the particular picture object previously has, and this in turn depends on the size of the particular picture object and the properties of the picture elements contained in the particular picture object.

In the following, example are given to indicate what additional influence the size of the picture object exerts in the merging of picture objects.

Starting out from a relatively large picture object to be segmented, small partial picture object at the outset of the segmentation method correspond to small samples and larger partial picture objects correspond to larger samples from the overall distribution of the relatively large picture object.

The smaller the partial picture objects are, the larger is the average deviation of its mean values from the average distribution value of the picture object. In partial picture objects consisting of merely a single picture element, this is by definition the standard deviation of the overall distribution of the picture object. The distribution of larger partial picture objects, in turn, already corresponds very much better to the overall distribution of the picture object. In general, this means that, based on distributions of feature values of larger partial picture objects, much more safe and accurate decisions can be made than based on distribution of feature values of smaller partial picture objects. At the same time, the error which results from wrongly merging large picture objects is substantially larger than the error which results from wrongly merging small picture objects.

Binding tolerances between large picture objects should therefore, at otherwise identical distribution properties, be more strict than between small picture objects. Consequently, the size of the picture objects must be taken into consideration in merging. This is achieved for example by a further differentiation of inequation (2) as can been seen from the inequation (3) below.

$$\frac{n_{\min}\varepsilon|m_1 - m_2|}{\sigma_1 + \sigma_2} < \alpha \tag{3}$$

In inequation (3) $n_{min}$ designates the size of the smaller one of two contiguous picture objects by means of the number of the picture elements and $\varepsilon$ designates a globally predetermined parameter which indicates how strongly this size is to influence the homogeneity criterion. If $\varepsilon=0$, the size of the two contiguous picture objects is not taken into consideration. The larger $\varepsilon$ is selected, the larger the difference between the binding tolerance in merging smaller picture objects and the strictness in merging larger picture objects becomes.

The following is an example of a criterion which evaluates the difference in the mean values and in the standard deviations. In a similar manner as in inequation (2), the similarity of the standard deviations can additionally be included in the homogeneity criterion. The homogeneity criterion is then obtained as the following relation (4) containing two inequations which must be satisfied at the same time ($\Lambda$ is the logical AND operator).

$$\frac{n_{\min}\varepsilon|m_1 - m_2|}{\sigma_1 + \sigma_2} < \alpha \wedge \frac{\left(\sqrt{n_1 + n_2}\right)\varepsilon|\sigma_1 - \sigma_2|}{\sigma_1 + \sigma_2} < \beta \tag{4}$$

In relation (4) $\beta$ designates a globally predetermined parameter, i.e. a further tolerance, and $n_1$ and $n_2$ designate the number of the picture elements of the two contiguous picture objects.

In the following, the second type of homogeneity criteria will be described in further detail.

By using this second type of homogeneity criteria even better results may be obtained. Homogeneity criteria of the second type are those which determine the difference between feature values of two contiguous picture objects by the heterogeneity introduced into the segmentation through merging of two contiguous picture objects by comparison of the conditions after and before merging. The smaller the introduced heterogeneity is, the smaller is also the difference in feature values of the two contiguous picture objects. The size, i.e. the number of the picture elements of the respective picture objects is also taken into consideration by weighting. Instead of attempting to merge two contiguous picture objects having maximum possible homogeneity by direct comparison of features between the two contiguous picture objects, the actual condition after merging is compared with the one before merging by means of the second type of homogeneity criteria. Thus, it is ensured that as little as heterogeneity as possible is introduced into the segmentation.

In general, a homogeneity criterion of the second type can be determined as the heterogeneity $\Delta h_w$ of a potentially newly formed picture object via a weighted difference of color mean values of respective picture objects before and after merging as shown in inequation (5) below.

$$\Delta h_w = (n_1+n_2)h_{new} - (n_1 h_1 + n_2 h_2) < \alpha \tag{5}$$

In inequation (5) $\alpha$ is the predetermined tolerance, $h_1$ and $h_2$ are heterogeneities of the respective picture objects, $n_1$ and $n_2$ are sizes of the respective picture objects and $h_{new}$ is the heterogeneity of the potentially newly formed picture object. Thus, $\Delta h_w$ is the difference between the heterogeneities of the respective picture objects weighted with the size of the respective picture after merging and before.

In more detail, this second type of homogeneity criterion as shown in inequation (5) can be defined as follows.

The heterogeneity of the potentially newly formed picture object can defined as weighted standard deviation of color mean values of the respective picture objects as shown in inequation (6) below.

$$\Delta h_w = \Delta \sigma_w = (n_1+n_2)\sigma_{new} - (n_1\sigma_1 + n_2\sigma_2) < \alpha \tag{6}$$

In inequation (6) $\sigma_1$ and $\sigma_2$ are standard deviations of the respective picture objects and $\sigma_{new}$ is the standard deviation of the potentially newly formed picture object. In this case, a predetermined value for the standard deviation can be used for small picture objects having a size of approximately one to five picture elements.

The heterogeneity of the potentially newly formed picture object can be defined as the weighted variance of color mean values of the respective picture objects as shown in inequation (7) below.

$$\Delta h_w = \Delta var_w = (n_1+n_2)var_{new} - (n_1 var_1 + n_2 var_2) < \alpha \tag{7}$$

In inequation (7) $var_1$ and $var_2$ are variances of the respective picture objects and $var_{new}$ is the variance of the potentially newly formed picture object.

The heterogeneity of a potentially newly formed picture object can be determined via a weighted difference of color mean values of the respective picture objects before and after merging as shown in inequation (8) below.

$$\Delta h_w = \Delta m_w = (n_1+n_2)|m_{new}| - (n_1|m_1| + n_2|m_2|) < \alpha \tag{8}$$

In inequation (8) $m_1$ and $m_2$ are color mean values of the respective picture objects and $m_{new}$ is the color mean value of the potentially newly formed picture object.

In more detail, as shown in inequations (6) to (8) the second type of homogeneity criterion includes the comparison of the weighted standard deviation, the comparison of the weighted mean value modification and the comparison of the weighted variance after and before merging, respectively.

Another homogeneity criterion of the second type is suited for segmenting picture regions having continuous color transitions. The heterogeneity of the potentially newly formed picture object is defined as one of the average distance and the average value of the squares of the distances of the color mean values of the respective picture objects depending on the dimensionality of the topical space in relation to a regression line, surface or hypersurface of the color mean values in the topical space or in relation to another function of approximation to the color mean values in the topical space. To this end, for example in a two-dimensional picture the average distance or the averaged square distance of the color mean values of partial picture objects, such as for example the picture elements, from a regression surface of these color mean values in the topical space is determined using complex functions. This is then the measure for the heterogeneity of the picture object and can be used in inequation (5). In this manner, picture objects having a maximum continuous change or no change of color over the regression line are formed. Depending on necessity, the color distribution on the topical space can also be approximated by linear functions instead of by complex functions. Such homogeneity criterion is, for example, suited for segmenting two-dimensional photographic representations of three-dimensional objects and the color developments created by such representation into suitable picture objects.

The kind of matching will now be described in further detail.

In general, simple matching, best matching, mutual best matching and global best matching are used.

By using simple matching merging is performed if a feature difference defined in the homogeneity criterion is contained within the predetermined tolerance. By using best matching merging is performed only if a feature difference defined in the homogeneity criterion for one of contiguous picture objects is smallest in comparison with the other contiguous picture objects and contained within the predetermined tolerance. By using mutual best matching merging is performed only if for two contiguous picture objects a feature difference defined in the homogeneity criterion is smallest in comparison with all other contiguous picture objects and is contained within the predetermined tolerance. Finally, by using global best matching merging is performed only if a feature difference defined in the homogeneity criterion is smallest in comparison with all other possible combinations of picture objects and is contained within the predetermined tolerance.

In the order of simple matching, best matching, mutual best matching and global best matching the quality of the segmentation successively increases as has been found by the inventors of the present invention by using the average weighted standard deviation of the average color mean values of the picture objects or the average weighted variance of the color mean values of the picture objects as a measure for the homogeneity and thus for the quality of the segmentation.

By employing mutual or global best match, a development of segmentation is ensured which initially starts in picture regions having a maximum possible degree of homogeneity, continues via ever more heterogeneous picture objects, until further merging of picture objects is prevented due the threshold defined by the predetermined tolerance. In more detail, similarly to watershed transformation methods, segmentation is started in picture regions having the highest degree of homogeneity, however picture regions having a higher degree of heterogeneity are subsequently also segmented and set apart from each other and from homogeneous ones.

As to the predetermined tolerance it should be noted that pertinence of picture objects is defined in such a way that the feature difference of two contiguous picture objects to be merged, which is determined in the homogeneity criterion, must be contained within the predetermined tolerance.

Referring again to FIG. 1, in the next step S130 a picture object is selected. Although only one picture object is selected in step S130 it is also possible to select several picture objects at the same time. Thus, it is possible to generate segmentation kernels in a maximum possible number of locations of the picture region to be segmented. Such segmentation kernels. The higher the number of locations at which the segmentation is started at the same time, i.e. the higher the number of kernels available for the segmentation, the higher is the differentiation possible in performing the segmentation. For this reason it is advantageous to use an order in processing the picture objects which ensures a maximum possible geographical distance from already processed picture objects. Such order can be pseudo-stochastic, i.e. random. It should be noted that the order of processing of the picture objects is fundamentally independent of the type of the homogeneity criterion. By means of these measures it is achieved that the segmentation leads to very good results even where a picture is characterized by being highly textured and contiguous picture objects present overlapping feature ranges.

In the next step S140 it is determined in the whether the selected picture object and one of the picture objects contiguous thereto are conforming or not conforming based on determining if a difference in feature values between the selected picture object and the picture objects contiguous thereto is contained within the selected tolerance of the selected homogeneity criterion and if the selected kind of matching is satisfied. By means of this at most one of the contiguous picture objects and the selected picture object are determined to be conforming. If it is determined in step S140 that the selected picture object and one of the contiguous picture objects are conforming, step S150 is carried out to merge these picture objects in order to form a new picture object and, then step S160 is carried out. If it is determined in step S140 that the selected picture object does not conform with any of the contiguous picture objects, step S160 is directly carried out.

Figure 2:
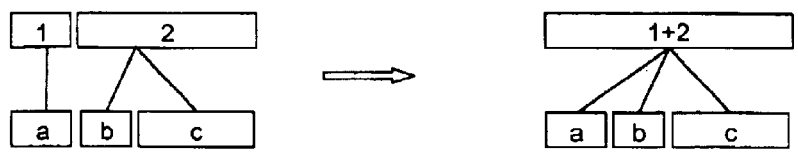
FIG. 2 illustrates an operation "merging" performed in the method in accordance with the embodiment of the present invention.

FIG. 2 illustrates an operation "merging" which is performed in step S150 in FIG. 1. As is obvious from FIG. 2 a picture object "1" having a picture object "a" as a sub-picture object and a picture object "2" having picture objects "b" and "c" as sub-picture objects are merged to form a new picture object "1+2" having picture objects "a", "b" and "c" as sub-picture objects.

In step S160 it is determined whether more picture objects should be processed. It should noted that each picture object which is present at the outset of a run of steps S130 to S160 is selected once at the most and preferably once. If it is determined in step S160 that more picture objects must be processed, the routine returns to step S130. If it is determined in step S160 that all picture objects have been processed, step S170 is carried out to determine whether there is a stable condition in which no further contiguous picture objects are determined to be conforming, i.e. in which no further merging of picture objects occurs and the segmentation result converges and remains unchanged despite further processing. If it is determined in step S170 that there is no stable condition, the routine returns to step S130. If it is determined in step S170 that there is a stable condition, step S180 is carried out to determine whether a further processing on another plane of a hierarchical structure of picture objects is to be performed. If it is determined that no further processing is to be performed, the method is completed. If it is determined that a further processing on another plane is to be performed, the routine returns to step S100.

The formation of such hierarchical structure will now be described in further detail.

It is now assumed that there is a digital picture containing picture elements and that no further picture objects are formed.

After performing steps S100 to S120 to thereby select the homogeneity criterion, the kind of matching and the tolerance for the homogeneity criterion, each picture element is duplicated on a new hierarchical plane. Then, each picture object is allocated a corresponding picture element as an over-picture object. Thus, the new hierarchical plane has already formed entirely. Carrying out steps S130 to S160 in multiple, repeated runs until there is a stable condition as mentioned above results in merging of picture objects on the new hierarchical plane to thereby form picture objects having one or several picture elements as sub-picture objects. Thus, there is provided a hierarchical structure in which the picture elements are present as a lowest hierarchical plane.

Thus, by means of multiple repetitions of steps S130 to S160 one hierarchical plane of a hierarchical structure is formed. If it is determined that a further processing on another plane is to be performed, steps S100 to S120 are carried out again and in step S120 a new tolerance for the homogeneity criterion is selected. Such selection of a new tolerance sets a new resolution for the segmentation and thus results in the formation of a new hierarchical plane. The resolution of the segmentation can be expressed as the average number of picture elements per segment.

If a larger tolerance is selected, a higher hierarchical plane of the hierarchical structure is formed and if a smaller tolerance is selected a lower hierarchical plane is formed. If a tolerance is selected which is larger than a tolerance of a hierarchical plane already formed and lower than a tolerance of another hierarchical plane already formed, a new hierarchical plane is inserted between these already formed hierarchical planes.

By means of the selected tolerance for the homogeneity criterion it is determined on which hierarchical level a new hierarchical plane is to be inserted into an already existing hierarchical structure of picture objects. Then, each picture object on a next lower hierarchical plane with respect to the new hierarchical plane is removed from its previous over-object and is duplicated on the new hierarchical plane. Then the picture object on the next lower hierarchical plane is allocated the duplicated picture object as an over-object and the duplicated picture object is inserted into the previous over-picture object of the picture object on the next lower hierarchical plane as a sub-picture object. Thus, the new hierarchical plane has already formed entirely. Carrying out steps S130 to S160 in multiple, repeated runs until there is a stable condition as mentioned above results in merging of picture objects on the new hierarchical plane to thereby form picture objects having sub-picture objects. Thus, there is provided a hierarchical structure in which the picture elements are present as a lowest hierarchical plane. It should be noted that only such contiguous picture objects on the new hierarchical plane can be merged which have the same over-picture object.

Figure 7:
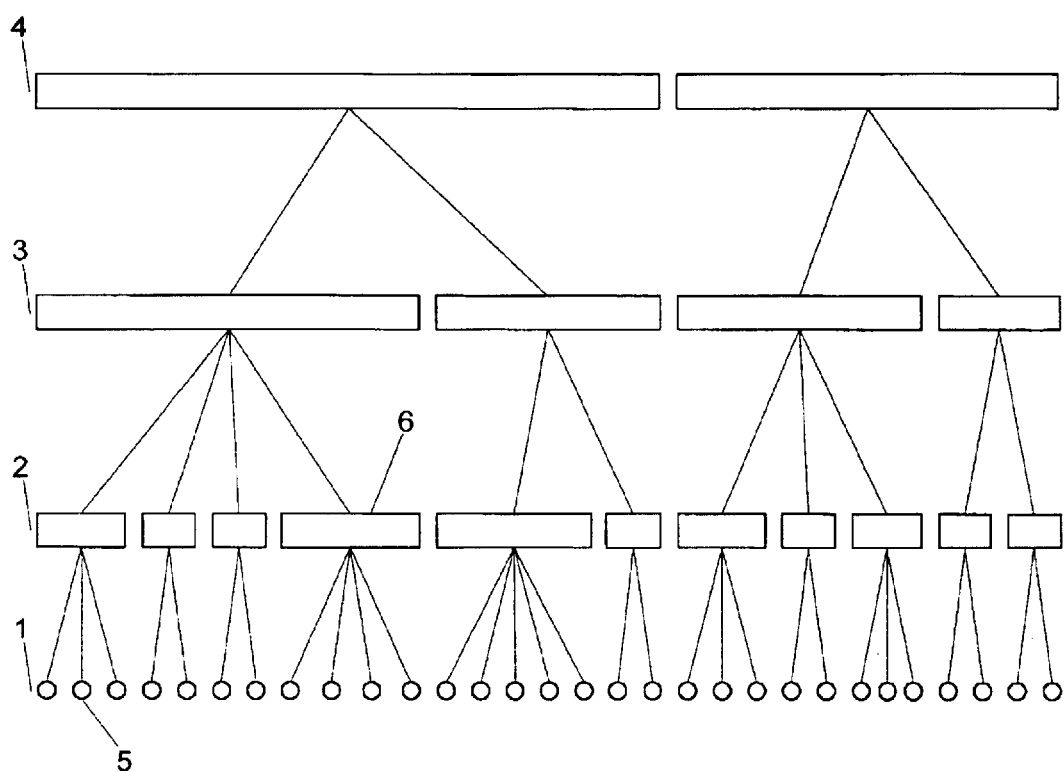
FIG. 7 illustrates a hierarchical structure formed by the method in accordance with the embodiment of the present invention.

By repeating the method of segmentation by means of using different tolerances a hierarchical structure is formed as shown in FIG. 7.

FIG. 7 illustrates a hierarchical structure having first to fourth hierarchical planes 1 to 4. on the lowest hierarchical plane, which is the first hierarchical plane 1, picture elements 5 are located, which are merged on the second hierarchical plane 2 to form picture objects 6 having the picture elements 5 as sub-picture objects. Furthermore, the picture objects 6 on the second hierarchical plane 2 are merged on the third hierarchical plane to form picture objects 6 having the picture objects 6 on the second hierarchical plane as sub-picture objects and so on.

The highest hierarchical plane of the hierarchical structure can obtain only one picture object, if the tolerance is set to an appropriate large value.

By means of the hierarchical structure picture information is concurrently present in a segmented condition in various degrees of resolution.

Once a hierarchical structure is formed, the order of processing can be an arbitrary order. For example, the order of processing can start on the lowest possible hierarchical plane tom then stepwise process higher hierarchical planes or the order of processing may start on the highest possible hierarchical plane to then process stepwise lower hierarchical planes or the roder of processing may be any desired one and a new hierarchical plane are also inserted between two other hierarchical planes.

There has been described the operation of merging. However other operations can be used to process the picture objects and to improve the result of the segmentation. Such operations comprise the operations "exclusion" and "boundary correction".

Figure 3:
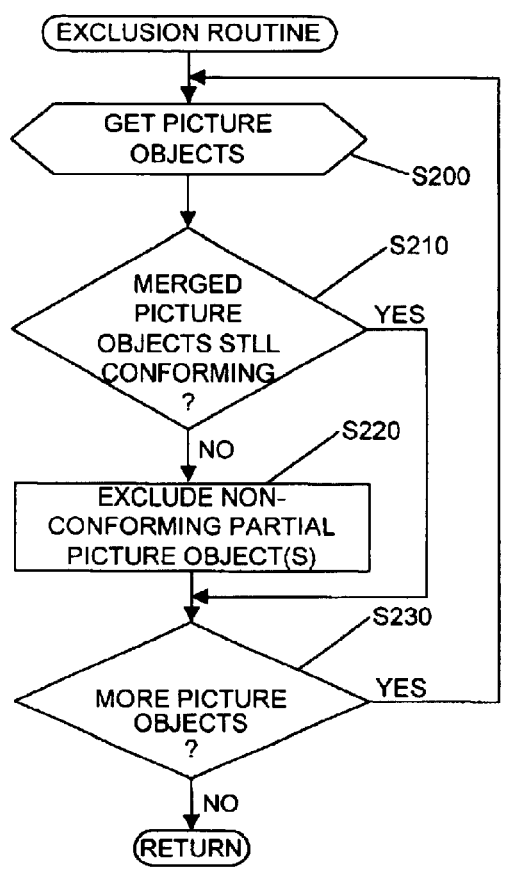
FIG. 3 illustrates a flow chart of an exclusion routine which can be performed in the method in accordance with the embodiment of the present invention.

FIG. 3 illustrates a flow chart of an exclusion routine which can be performed in the method in accordance with the embodiment of the present invention.

It should be noted that this exclusion routine can be performed in addition to steps S130 to 5160 of FIG. 1 or in parallel in an arbitrary order.

As shown in FIG. 3 in step S200 a picture object is selected. The selection is performed in the same manner as described with reference to step S130 in FIG. 1 and thus a detailed description is omitted here. In step S210 it is determined whether picture objects which have been merged to form the selected picture object still conform. The determination of step S210 is the same as the determination of step S140 of FIG. 1 and thus a detailed description is omitted here. If it is determined in step S210 that the merged picture objects still conforming step S230 is carried out. If it is determined that the merged picture objects do not still conforming then step S220 is carried out. In step S220 non-conforming partial picture objects of the selected picture object are excluded from the selected picture object. In step S220 it is determined whether more picture objects are to be processed. The determination of this step is the same as the determination of step S160 in FIG. 1 and thus a detailed description is omitted here. After step S230 the exclusion routine is completed.

Figure 4:
FIG. 4 illustrates an operation "exclusion" performed in the routine shown in FIG. 3.

FIG. 4 illustrates an operation "exclusion" which is performed in step S220 in FIG. 3. As is obvious from FIG. 4 picture object "1+2" having picture objects "a", "b" and "c" as sub-picture objects is divided by exclusion to form new a picture object "1" having picture object "a" as sub-picture object and a new picture object "2" having picture objects "b" and "c" as sub-picture objects.

Figure 5:
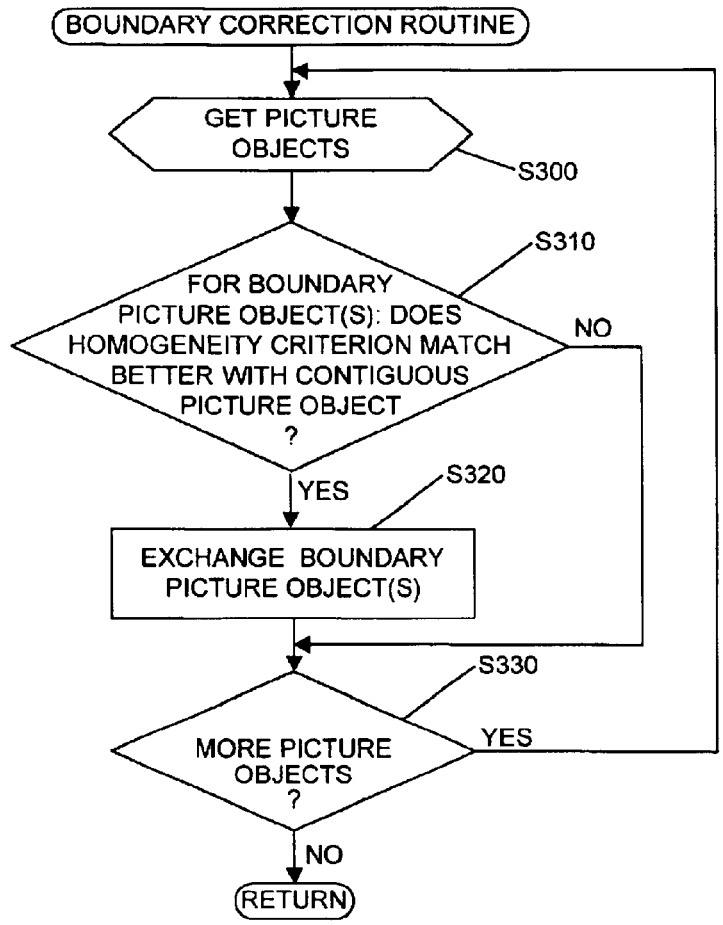
FIG. 5 illustrates a flow chart of a boundary correction routine which can be performed in the method in accordance with the embodiment of the present invention.

FIG. 5 illustrates a flow chart of a boundary correction routine which can be performed in the method in accordance with the embodiment of the present invention.

It should be noted that this boundary correction routine can be performed in addition to at least one of steps S130 to S160 of FIG. 1 and steps S200 to S230 of FIG. 3 or in parallel in an arbitrary order.

As shown in FIG. 5 in step S300 a picture object is selected. The selection is performed in the same manner as described with reference to step S130 in FIG. 1 and thus a detailed description is omitted here. In step S310 it is determined whether for boundary picture objects of the selected picture object which are sub-picture objects of the selected picture object on the next lower hierarchy plane the homogeneity criterion does match better with other contiguous picture objects of the selected picture object. If it is determined in step S310 that the homogeneity does not match better with other contiguous picture objects of the selected picture object step S330 is carried out. If it is determined that the homogeneity criterion does match better with one of the contiguous picture objects of the selected picture object step S320 is carried out to exchange the boundary picture objects to now be a new boundary picture object of the contiguous picture object of the selected picture object with which the homogeneity criterion is satisfied best.

The determination and exchange carried out in steps S310 and S320 can be carried out such that if the homogeneity criterion is satisfied with the already merged picture objects as well as with one of one and several contiguous picture objects, feature distributions of already merged picture objects and the one of one and several contiguous picture objects are calculated and based thereon, a pertinence of the boundary picture object is determined in such a manner that the boundary picture object is allocated to the one picture object wherein a feature value of the boundary picture object occurs most frequently or that the boundary picture object is allocated to a picture object in a probabilistic manner by calculating probabilities based on a frequency of occurrence of the feature value of the boundary picture object in the already merged picture objects and the one of one and several contiguous picture objects. For example, for the feature distributions respective histograms of the features of the already merged picture objects and the one of one and several contiguous picture objects are referred to.

Then step 320 is carried out. In step S320 it is determined whether more picture objects are to be processed. The determination of this step is the same as the determination of step S160 in FIG. 1 and thus a detailed description is omitted here. After step S330 the boundary correction routine is completed.

Figure 6:
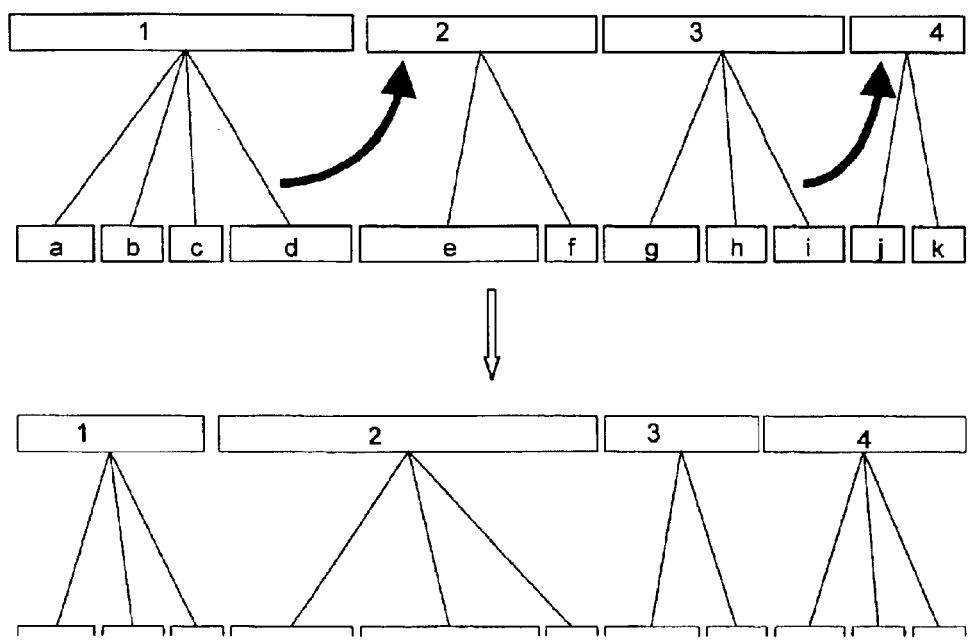
FIG. 6 illustrates an operation "boundary correction" performed in the routine shown in FIG. 5.

FIG. 6 illustrates an operation "boundary correction" performed in the routine shown in FIG. 5.

As a criterion for

As shown in FIG. 6 a boundary picture object "d" of picture object "1" is exchanged between picture object "1" and picture object "2" to become a new boundary picture object of picture object "2" and a boundary picture object "i" of picture object "3" is exchanged between picture object "3" and picture object "4" to become a new boundary picture object of picture object "4".

Segmentation with homogeneity criteria that are adapted in an object-related manner can be performed in accordance with features or classification. Various homogeneity criteria can be employed in accordance with specific features of the picture objects comprising compactness, size, boundary roughness, linearity, gradient of color development and their classification.

In the exclusion and boundary correction routines described above coherence of picture objects must be ensured. When a picture object is sorted out in a thin location of its over-picture object due to exclusion or boundary correction, there is the possibility that the over-picture object loses its direct vicinity coherence. In this case, the over-picture object must be divided into corresponding coherent picture objects.

The fact that a picture object is modified by merging, exclusion and boundary correction results in a modification of its properties and thus of the homogeneity criterion. Picture objects previously not having matched this picture object may now match this picture object. Vice versa picture objects which once were incorporated into this picture object may now not satisfy the now modified homogeneity criterion with this picture object any more. In this way, continuous picture objects are merged, boundaries of picture objects are shifted or picture objects not matching any more are excluded from a over-picture object.

The dependency of the respective segmentation status on the specific development of the picture or of the picture object, i.e. the historicity of the method, is herein consciously accepted. The iterative, cyclical optimization of the picture has the result that the final state is reproducibly of the same kind although small differences may occur in details. This does, however, not affect the high quality of the final results.

There is also the possibility that boundary picture objects are not referred to for the determination of properties of large picture objects.

In the following, examples for processing the homogeneity criterion in segmentation through several channels shall be explained. The term "channel" should in this context be understood to indicate that the respective picture consists of several single pictures, i.e. channels, having different information contents.

Where a digital picture is available in a plurality of channels, the question is how an overall decision can be made based on the examination of the homogeneity criterion, which occur in every decision about each channel.

On the one hand, it is possible to refer to an absolute criterion. Unless the homogeneity criterion is satisfied in each channel, combining of picture objects is not performed. Hereby good utilization is ensured. Even if the homogeneity criterion is satisfied in many channels, the difference in another channel nevertheless signifies that the underlying picture structures are different.

On the other hand, it is also possible to sum up or average the differences of features such as standard deviations, variances or mean values of color values of picture objects which the homogeneity criterion determines in each channel as a quality criterion through all channels. The channels may for this purpose be weighted differently. If a quality criterion is employed in the overall segmentation which also averages through the channels, then summing up or averaging in application of the homogeneity criterion leads to better results than an absolute criterion.

In boundary correction the overall probability of pertinence results in the geometrical average of the single probability of pertinences in every channel. This means that up to a certain degree, a worse probability of pertinence in a channel can be compensated by a good one in another one. Nevertheless when the pertinence in a channel is particularly bad, this is expressed clearly in geometrical averaging despite good pertinence in other channels.

The following description of the method refers to the segmentation of lines which can be additionally performed.

At the outset, in accordance with the above description, segmentation is performed, with one of the homogeneity criteria of the second type which examines the feature difference between two picture objects via the heterogeneity introduced in a potential combination being used in mutual best match. For each processed picture object the best matching contiguous picture object is searched and these are combined only if the best match is actually mutual. At the same time, a "linearity" feature is defined which, for example, indicates the ratio of length and width of the picture object. Each processed picture segment is examined as to its linearity. When the linearity exceeds a specific predetermined value, the segment is processed, in addition to the above described manner of proceeding, as a line object. i.e. in addition to the directly adjacent neighbours, matching picture objects complementing the line are also searched in the direction of the line ends as far as a predetermined distance and in a sector of a predetermined angle. In the degree in which the line is complemented in a combination, a factor $f$ ($0 \leq f \leq 1$) is reduced, with the feature difference in the homogeneity criterion being additionally reduced with this factor. In this manner matching with picture objects complementing the line is comparable to matching with normal picture objects. A linear picture object can, depending on mutual best match, be combined with contiguous picture objects in such a way that linearity is increased, however also be combined in the usual manner, with linearity decreasing as a consequence.

Where a picture object not located in directly contiguous vicinity and complementing a line is found in best match, it is possible to draw a connecting line having a minimum thickness which ensures coherence. The eligible picture objects must then possibly be sorted out from already existing picture objects and subsequently be allocated to the line object.

In the case of very thin line structures it can additionally be of advantage to admit a diagonal vicinity for small and for linear picture objects, whereas for all other picture objects only planar but not diagonal coherence is possible. Hereby lines and line kernels can be created more easily in the segmentation. When a hitherto small, diagonally coherent picture object exceeds a critical size or when a hitherto linear picture object drops below a critical linearity as a result of merging, it is divided into its components having planar coherence.

Figure 8:
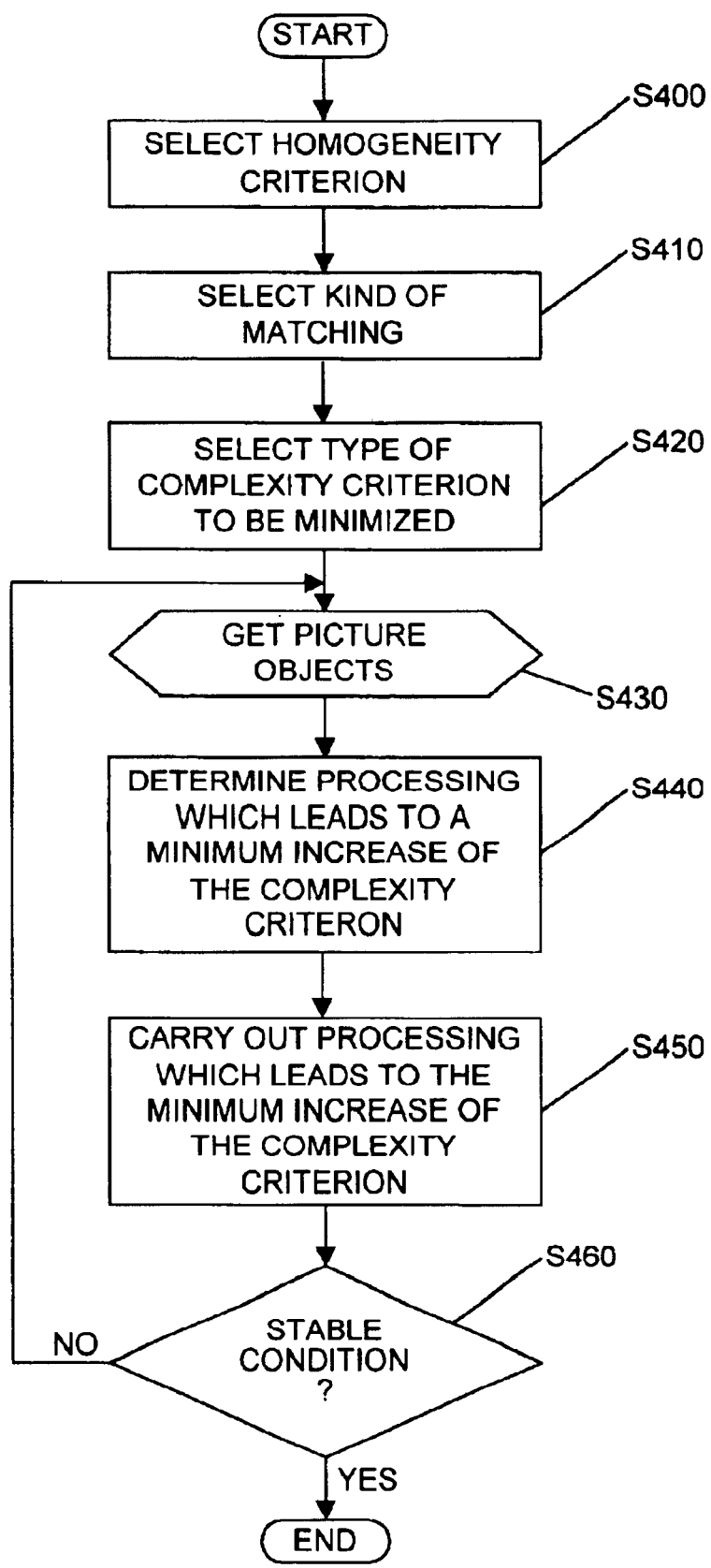
FIG. 8 illustrates a flow chart of a method in accordance with a modification of the embodiment of the present invention.
Figure 9:
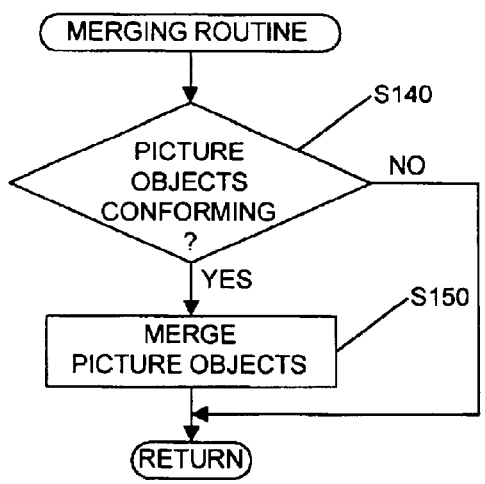
FIG. 9 illustrates a flow chart of a merging routine which can be performed in the method in accordance with the modification of the embodiment of the present invention.
Figure 10:
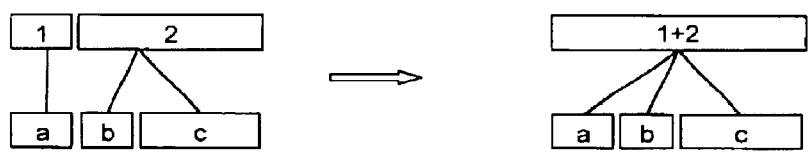
FIG. 10 illustrates an operation "merging" performed in the routine shown in FIG. 9.
Figure 11:
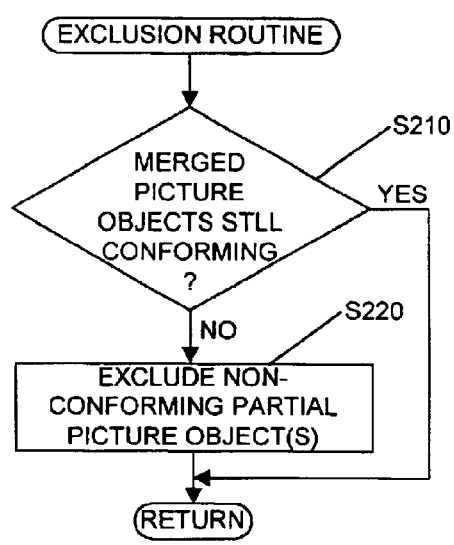
FIG. 11 illustrates a flow chart of an exclusion routine which can be performed in the method in accordance with the modification of the embodiment of the present invention.
Figure 12:
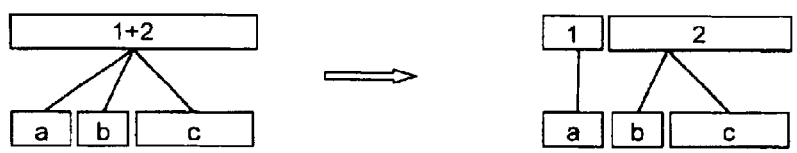
FIG. 12 illustrates an operation "exclusion" performed in the routine shown in FIG. 11.
Figure 13:
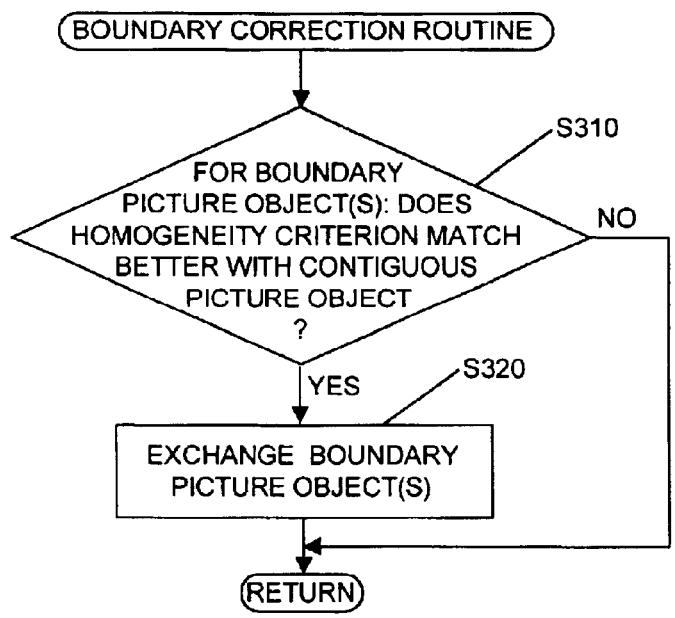
FIG. 13 illustrates a flow chart of a boundary correction routine which can be performed in the method in accordance with the modification of the embodiment of the present invention.
Figure 14:
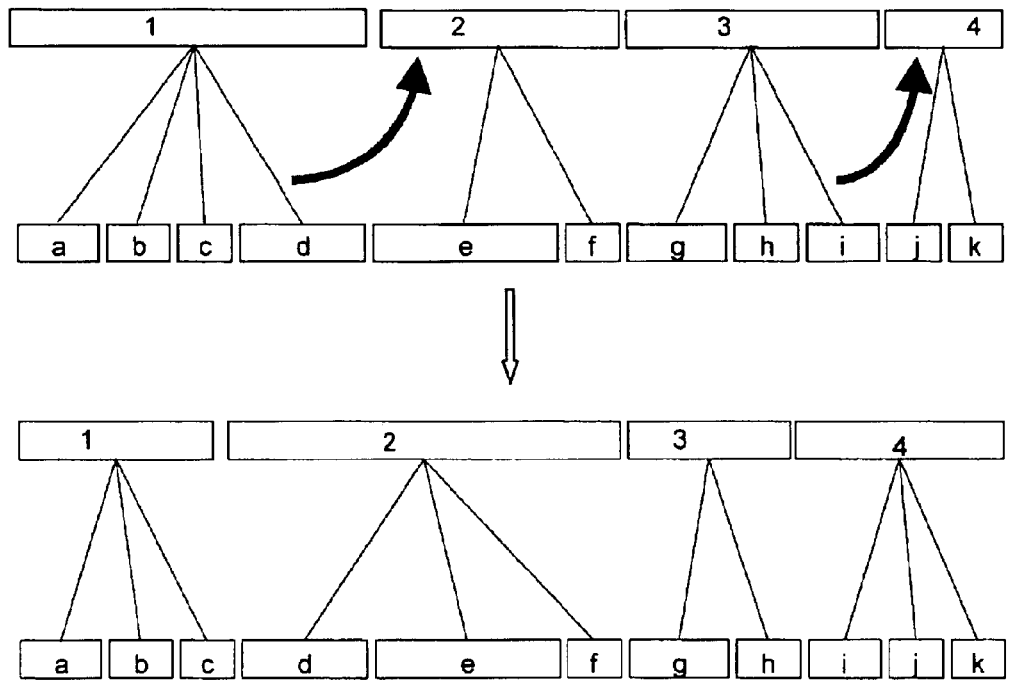
FIG. 14 illustrates an operation "boundary correction" performed in the routine shown in FIG. 13.

Referring now to FIG. 8, there is illustrated a flow chart of a method for segmentation of a digital picture in accordance with a modification of the embodiment of the present invention.

The method of the modification of the embodiment of the present invention will be described by means of describing merely the modifications with respect to the embodiment of the present invention. All other features described above with respect to the embodiment of the present invention are also applicable on the modification of the embodiment of the present invention.

In steps S400 and S410 in the same manner as described with respect to steps S100 and S110 of FIG. 1 a homogeneity criterion and a kind of matching are selected. However, in the next step S120 a type of complexity criterion to be minimized is selected.

Such complexity criterion defines a defined value for the complexity of an entire structure consisting of all picture object and can be further defined as the sum through all picture objects in the hierarchical structure of standard deviations of color mean values of objects multiplied by the number of picture objects on a next lower hierarchical plane in each picture object as shown in equation (9).

$$C = \sum_i \sigma_{U_{dir}} n_{i_{U_{dir}}} \qquad (9)$$

In equation (9) C designates the defined value for the complexity, $\sigma_{i_{U_{dir}}}$ designates the standard deviation of the color mean value of a respective picture object i, and $n_{i_{U_{dir}}}$ designates the number of the picture objects on a next lower hierarchical plane in each picture object.

Furthermore, the complexity criterion can be further defined as the sum through all picture objects in the hierarchical structure of variances of color mean values of the picture objects on a next lower hierarchical plane in each picture object multiplied by the number of picture objects on the next lower hierarchical plane in each picture object as shown in equation (10).

$$C = \sum_i \text{var}_{U_{dir}} n_{i_{U_{dir}}} \qquad (10)$$

In equation (10) C designates the defined value for the complexity, $\text{var}_{i_{U_{dir}}}$ designates the variance of the color mean value of a respective picture object i, and $n_{i_{U_{dir}}}$ designates the number of the picture objects on the next lower hierarchical plane in each picture object.

Figure 15:
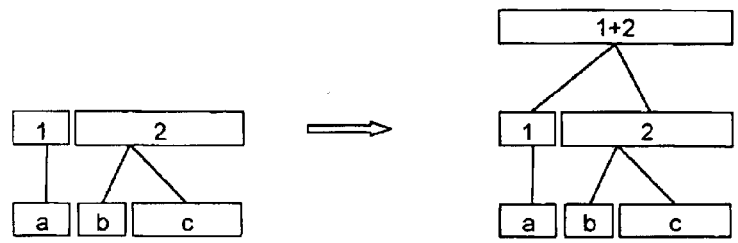
FIG. 15 illustrates an operation "founding" which can be performed in the method in accordance with the modification of the embodiment of the present invention.

Furthermore, in the same manner as described with respect to step 130 of FIG. 1 a picture object is selected. In the next step S440 a processing is determined which leads to a minimum increase of the complexity criterion. Such processing includes the operations aforementioned operations of merging, exclusion and boundary correction. This operations are shown in FIGS. 9 to 14. Due to the fact that steps of FIGS. 9 to 14 having the same reference signs as steps of FIGS. 3 to 6 are carried out in the same manner the detailed description of these steps is omitted here. In addition, the operation "founding" can be carried out in such a manner that a new over-picture object is formed on the next higher hierarchical plane for two contiguous picture objects. This is shown in FIG. 15 in further detail. As is obvious from FIG. 15 from to picture objects "1" and "2" a new picture object "1+2" is formed on the next hierarchy plane as an over-picture object of picture objects "1" and "2". It should be noted that respective modifications are performed on respective highest local hierarchical planes of the hierarchical structure which is formed as described later.

After it has been determined which processing leads to the minimum increase of the complexity criterion this processing is carried out in the next step S450. In the next step S460 it is determined in a similar manner as in step S170 whether a stable condition is reached. In the modification of the embodiment of the present invention such stable condition is reached if the entire picture is combined as one picture object on the highest hierarchical plane. Thus, the complexity criterion is a continuation criterion and not a termination criterion as in the embodiment of the present invention.

Figure 16:
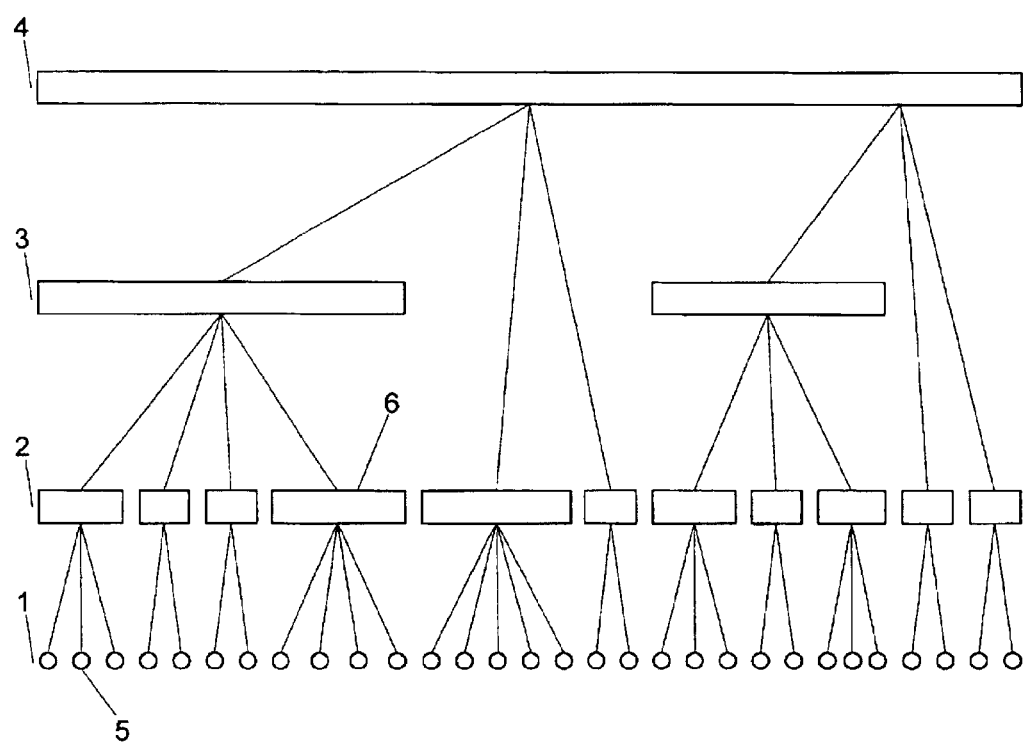
FIG. 16 illustrates a hierarchical structure formed by the method in accordance with the modification of the embodiment of the present invention.
Figure 17:
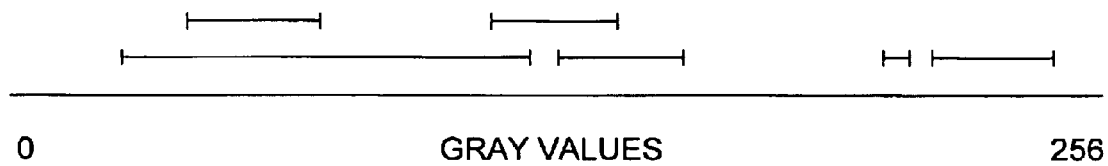
FIG. 17 illustrates gray values of six picture objects each presenting a differently sized range of gray values within a scale of gray values between 0 and 256.

In accordance with method the modification of the present invention no tolerance for the homogeneity criterion must be selected an a hierarchical structure is formed automatically by founding new picture objects on a higher hierarchical plane. This leads to a hierarchical structure having several hierarchical planes which are present in a locally different hierarchical depth as shown in FIG. 16.

The following advantages can be achieved with the method of the present invention.

The method of the present invention achieves high flexibility, high-quality segmentation in a desired resolution, simultaneous representation of the segmentation in various degrees of resolution and in the form of a hierarchical object structure, processing of highly textured pictures, separating highly textured picture regions from more homogeneous picture regions, separation of picture regions even when they present overlapping feature ranges, processing of pictures having any dimensionality which are, for example, generated by a one-, two-, or three-dimensional imaging or other technique, and object-related admission of specific homogeneity criteria such that for example line structures or picture regions having a constant color development are also subjected to segmentation.

The method of the present invention is distinguished from other segmentation methods, for example one- or multiple-threshold methods, by flexibility and quality. A particular strong point resides in the segmentation of textured pictures or data records, for example radar or X-ray pictures, something which often turns out to be difficult with other methods, in the concurrent segmentation of homogeneous and heterogeneous picture regions, in the simultaneous representation of several planes of resolution in the form of a hierarchical object structure, and in the concurrent representation of specific different picture structures, such as area and line segments or picture regions not having color development, and those having color development.

The method largely works in the absence of beforehand knowledge, i.e. in the absence of beforehand knowledge with the exception of setting a tolerance, and is extremely flexible with respect to the desired picture resolution, i.e. the average number of picture elements per segment. The method can be performed largely in an automated manner, it does not require interactive intervention. It processes pictures or picture-type data records of any desired dimensionality. At a given resolution, very good segmentation results in terms of differential diagnosis are obtained. Identical structures are segmented jointly and separated from other structures. It is particularly also suited for finding and differentiating between textured picture objects having overlapping feature ranges, or for processing high-noise pictures. Other than the numerous prior art methods, the method of the present invention does not employ pixel classification and subsequent segmentation. Picture elements are rather segmented based on homogeneity criteria in such a manner that picture structures are combined in an expedient manner in terms of differential diagnosis. With respect to quality, it is superior to segmentation methods relying on thresholds, and it is superior to methods which perform segmentation with respect to particular texture features, in flexibility of the desired resolution and the capability of processing most variegated textures at the same time. With the segments thus obtained, essentially more information is available for a subsequent classification than with single picture elements. The classification probabilities thus made possible may therefore be increased distinctly. A maximum degree of condensation and utilisation of the existing information is achieved. This is not possible with prior art methods which employ partial ranges or distributions defined beforehand in the feature space and/or do not concurrently resolve in a plurality of planes. Differently textured objects are clearly delimited even when they present comparatively wide and overlapping feature distributions.

In many cases the demands to a segmentation are such that entire pictures are to be expediently segmented into their components to then carry out an overall classification. This is in contrast with methods whereby single specific object types are to be determined.

By the method described here an entire digital picture or a digital picture detail can be segmented entirely and very specifically with respect to detail even where little beforehand knowledge exists, which is also true if the picture is at the same time highly textured or noisy. This segmentation is then very well suited as a basis for a semantic classification of the entire picture. Therefore the method can be employed for all types of digital pictures, independently from the picture generation method and of the dimensionality.

The method is excellently suited for the processing of satellite and aerial pictures, of all kinds of medical images, namely of all two-dimensional as well as three-dimensional picture generation methods, but also for the simple picture object recognition. A particular suitability results for the segmentation and object recognition of three-dimensional pictures, such as for example in medical technology, which fact can be made use of for visualisation as well as for subsequent classification.

Pertinent picture structures are segmented even without detailed beforehand knowledge about the picture and its structures, whereas different picture structures, even those having overlapping feature distributions, are separated from each other. The segmentation thus achieved represents a very much better result for a classification than a pixel classification, because very much more information is contained in whole segments than in single picture elements (feature distributions, texture, shape, size etc.), however also better than results of other segmentation methods, because the quality of the found segmentation is very good, and with the aid of the tolerance the resolution of the segmentation may very specifically be adapted to the requirements. This information helps to considerably improve certainty of classification.

While a preferred embodiment of the present invention and a modification thereof has been shown and described, it will be understood that there is no intent to limit the present invention by such disclosure but rather it is intended to cover all modifications falling within the spirit and scope of the present invention as defined in the appended claims.

What is claimed is:

1. A method for segmentation of a digital picture consisting of a multiplicity of single picture elements comprising the following steps:

(a) determining if one of one and several features relating to contiguous picture objects comprising picture elements and picture segments are conforming or not conforming based on a specific homogeneity criterion by means of referencing a predetermined tolerance for each feature as a termination criterion, within which feature values relating to the contiguous picture objects in question may differ;

(b) if one of one feature and several features relating to the contiguous picture objects are determined to be conforming then merging the conforming picture objects; and (c) repeating the resulting segmentation until the resulting segmentation converges in a stable or approximately stable condition in which no further contiguous picture objects are determined to be conforming, wherein a feature difference is determined from a comparison between the specific homogeneity criterion and a tolerance via heterogeneity introduced by merging and arising from a potential combination of the contiguous picture objects.

2. The method of claim 1, wherein the feature difference to be compared in the homogeneity criterion is determined via heterogeneity introduced by merging two picture objects by determining a difference $\Delta h_w$ between heterogeneities of respective picture objects weighted with the size of the respective picture objects after and before merging so that homogeneity is expressed by the formula $$\Delta h_w = (n_1+n_2)h_{new} - (n_1 h_1 + n_2 h_2) < \alpha$$

wherein $\alpha$ is the predetermined tolerance, $h_1$ and $h_2$ are heterogeneities of the respective picture objects, $n_1$ and $n_2$ are sizes of the respective picture objects and $h_{new}$ is the heterogeneity of a potentially newly formed picture object.

3. The method of claim 2, wherein the heterogeneity of the potentially newly formed picture object is defined as standard deviation of color mean values of the respective picture objects as expressed by the formula $$\Delta h_w = \Delta \sigma_w (n_1+n_2)\sigma_{new} - (n_1 \sigma_1 + n_2 \sigma_2) < \alpha$$

wherein $\sigma_1$ and $\sigma_2$ are standard deviations of the respective picture objects and anew is the standard deviation of the potentially newly formed picture object.

4. The method of claim 3, wherein a predetermined value for the standard deviation is used for small picture objects having a size of approximately one to five picture elements.

5. The method of claim 2, wherein the heterogeneity of the potentially newly formed picture object is defined as the variance of color mean values of the respective picture objects as expressed by the formula $$\Delta h_w = \Delta var_w = (n_1+n_2)var_{new} - (n_1 var_1 + n_2 var_2) < \alpha$$

wherein $var_1$ and $var_2$ are variances of the respective picture objects and $var_{new}$ is the variance of the potentially newly formed picture object.

6. The method of claim 2, wherein the heterogeneity of a potentially newly formed picture object is determined via a weighted difference of color mean values of the respective picture objects before and after merging as expressed by the formula $$\Delta h_w = \Delta m_w = (n_1+n_2)|m_{new}| - (n_1|m_1| + n_2+|m_2|) < \alpha$$

wherein $m_1$ and $m_2$ are color mean values of the respective picture objects and $m_{new}$ is the color mean value of the potentially newly formed picture object.

7. The method of claim 2, wherein picture regions having continuous color transitions are combined and the heterogeneity of the potentially newly formed picture object is defined as one of the average distance and the average value of the squares of the distances of the color mean values of the respective picture objects depending on the dimensionality of the topical space in relation to a regression line, surface or hypersurface of the color mean values in the topical space or in relation to another function of approximation to the color mean values in the topical space.

8. The method of claim 1, wherein after step (c) the following steps are performed:
   (d) determining if a new tolerance is selected; and
   (e) if a new tolerance is selected then repeating the method for segmentation and returning to step (a) to thereby form a hierarchical structure of picture objects having different hierarchy planes.

9. The method of claim 8, wherein on a lowest hierarchy plane of the hierarchical structure picture elements are located, which are then at least on a next higher hierarchy plane of the hierarchical structure merged into over-picture objects, which may in turn be merged once or several times into over-picture objects on higher hierarchy planes of the hierarchical structure.

10. The method of claim 9, wherein the highest hierarchy plane of the hierarchical structure contains only one picture object.

11. The method of claim 8, wherein a new hierarchy plane is introduced in the hierarchical structure by initially duplicating all picture objects on a next lower hierarchy plane and inserting these picture objects in the new hierarchy plane as respective over-picture objects of the picture objects on the next lower hierarchy plane, wherein the picture objects on the new hierarchy plane which are determined to be conforming are merged in such a manner that only picture objects are merged which do not have different over-picture objects on a next higher hierarchy plane.

12. The method of claim 8, wherein an order in which picture objects of a plane are processed is an order which ensures a maximum possible distance from already processed picture objects and is a pseudo-stochastic order wherein in multiple, repeated runs on a hierarchical plane within one run each picture object present at the beginning of the run is processed once at the most by merging.

13. The method of claim 1, further comprising the following steps:
   (f) determining if one of one and several features of already merged picture objects are still conforming or not still conforming based on the specific homogeneity criterion; and
   (g) if one of one feature and several features of the already merged picture objects are determined not to be still conforming then excluding the not still conforming picture objects.

14. The method of claim 13, wherein steps (f) and (g) are performed in addition to steps (a) and (b) in an arbitrary order or in parallel.

15. The method of claim 13, further comprising the following steps:
   (h) determining if a boundary picture object of already merged picture objects located at a boundary of the already merged picture objects satisfies the homogeneity criterion with the already merged picture objects as well as with one of one and several contiguous picture objects; and
   (i) if the homogeneity criterion is satisfied with the already merged picture objects as well as with the one of one and several contiguous picture objects, allocating the boundary picture object to the picture object with which the homogeneity criterion is satisfied best.

16. The method of claim 15, wherein steps (h) and (i) are performed in addition to at least one of steps (a) and (b) and steps (f) and (g) in an arbitrary order or in parallel.

17. The method of claim 15, wherein if the homogeneity criterion is satisfied with the already merged picture objects as well as with the one of one and several contiguous picture objects, feature distributions of the already merged picture objects and the one of one and several contiguous picture objects are calculated and based thereon, a pertinence of the boundary picture object is determined in such a manner that the boundary picture object is allocated to the one picture object wherein a feature value of the boundary picture object occurs most frequently or that the boundary picture object is allocated to a picture object in a probabilistic manner by calculating probabilities based on a frequency of occurrence of the feature value of the boundary picture object in the already merged picture objects and the one of one and several contiguous picture objects.

18. The method of claim 17, wherein for the feature distributions respective histograms of the features of the already merged picture objects and the one of one and several contiguous picture objects are referred to.

19. The method of claim 15, wherein, if a boundary picture object is re-grouped from one picture object into another picture object, coherence of the one picture object is examined and in case of non-coherence of the one picture object the one picture object is divided into corresponding coherent picture objects formed by re-grouping.

20. The method of claim 15, wherein the digital picture comprises a plurality of single channels having a different information content and boundary picture objects are regrouped from one picture object into another picture object only if the pertinence to the other picture object averaged through all single channels is greater than the pertinence to the one picture object averaged through all single channels.

21. The method of claim 15, wherein in merging or boundary correction object-related various homogeneity criteria are employed in accordance with specific features of the picture objects comprising compactness, size, boundary roughness, linearity, gradient of color development, and their classification.

22. The method of claim 1, wherein merging is performed only if a feature difference defined in the homogeneity criterion for one of the picture objects is smallest in comparison with the contiguous picture objects and contained within the predetermined tolerance.

23. The method of claim 1, wherein merging is performed only if for two picture objects a feature difference defined in the homogeneity criterion is smallest in comparison with the other contiguous picture objects and is contained within the predetermined tolerance.

24. The method of claim 1, wherein merging is performed only if a feature difference defined in the homogeneity criterion is smallest in comparison with all other possible combinations of picture objects and is contained within the predetermined tolerance.

25. The method of claim 1, wherein picture objects are processed in a pseudo-stochastic order.

26. The method of claim 1, wherein picture objects are processed in an order which ensures maximal possible distance from already processed picture objects.

27. The method of claim 1, wherein several picture objects are processed simultaneously.

28. The method of claim 1, wherein the digital picture comprises a plurality of single channels having a different information content and picture objects are combined only if the homogeneity criterion referred to is satisfied for each one of the channels.

29. The method of claim 1, wherein the digital picture comprises a plurality of single channels having a different information content and wherein for the homogeneity criterion standard deviations, variances or mean values of color values of picture objects are added up or averaged through all channels, wherein the channels may be weighted differently.

30. The method of claim 1, wherein boundary picture objects are not referred to for determination of properties of large picture objects.

31. The method of claim 1, wherein the homogeneity criterion comprises texture features.

32. The method of claim 1, wherein a segmentation of lines is performed in which a value of linearity indicating a ratio of length and width of a picture object is used as a shape feature and picture objects are initially segmented such that each picture object exceeding a threshold for the value of linearity is processed as a line object.

33. The method of claim 32, wherein processing of a picture object as a line object comprises the following steps:
 searching for picture objects matching picture objects complementing a line in a direction of line ends beyond an immediate vicinity as far as a specific distance and in a sector having a specific angle;
 determining a factor which improves a matching value determined in the homogeneity criterion depending on how well a line is complemented by a previous line object, so that in case of an identical matching value linear combination is preferred to the usual combination;
 determining criteria for how well a line is complemented, such as an improvement of the linearity of the previous line object, in addition to at least one of identical color contrast with the surroundings and identical color; and
 establishing a connection having a minimum possible thickness between non-contiguous picture objects such that the line object is in any case diagonally coherent, if a matching picture object is not found in the immediate vicinity.

34. The method according to claim 32, wherein upon additionally performing linear segmentation, segmentation is initially performed with diagonal vicinity, wherein small and linear picture objects have diagonal coherence and all other picture objects have planar coherence, wherein, if a hitherto small, diagonally picture object exceeds a critical size or if a hitherto linear picture object drops below a critical linearity by area merging, it is divided into its components having planar coherence.

35. A method for segmentation of a digital picture consisting of a multiplicity of single picture elements comprising the following steps:
 (a) determining if one of one and several features relating to contiguous picture objects comprising picture elements and picture segments are conforming or not conforming based on a specific homogeneity criterion by means of determining a modification of the contiguous picture objects in question as a continuation criterion which leads to a minimum increase in a defined value for the complexity of an entire structure consisting of all picture objects;
 (b) if one of one feature and several features relating to the contiguous picture objects are determined to be conforming then combining the conforming picture objects; and
 (c) repeating the resulting segmentation until the resulting segmentation converges in a stable or approximately stable condition in which no further contiguous picture objects are determined to be conforming to form a hierarchical structure having a plurality of hierarchical planes which are present in a locally different hierarchical depth, wherein
 respective modifications are performed on respective highest local hierarchical planes of the hierarchical structure.

36. The method of claim 35, wherein a highest hierarchical plane consists of a single picture object containing all picture elements.

37. The method of claim 35, wherein the modifications comprise at least one of merging two contiguous picture objects, exclusion of a picture object from another picture object, allocating a boundary picture object located at the boundary of already merged picture objects to another contiguous picture object and founding a new picture object on a next higher local hierarchical plane to be formed.

38. The method of claim 35, wherein the defined value for the complexity is defined as one of the sum through all picture objects in the hierarchical structure of standard deviations of color mean values of objects multiplied by the number of picture objects on a next lower hierarchical plane in each picture object $$C = \sum_i \sigma_{U_{dir}} n_{i_{U_{dir}}}$$

wherein C is the defined value for the complexity, $\sigma_{i_{U_{dir}}}$ is the standard deviation of the color mean value of a respective picture object i, and $n_{i_{U_{dir}}}$ is the number of the picture objects on the next lower hierarchical plane in each picture object, and the sum through all picture objects in the hierarchical structure of variances of color mean values of the picture objects on the next lower hierarchical plane in each picture object multiplied by the number of picture objects on the next lower hierarchical plane in each picture object $$C = \sum_i \mathrm{var}_{U_{dir}} n_{i_{U_{dir}}}$$

wherein C is the defined value for the complexity, $\mathrm{var}_{i_{U_{dir}}}$ is the variance of the color mean value of a respective picture object i, and $n_{i_{U_{dir}}}$ is the number of the picture objects on the next lower hierarchical plane in each picture object.

* * * * *

UNITED STATES PATENT AND TRADEMARK OFFICE
CERTIFICATE OF CORRECTION

PATENT NO. : 6,832,002 B2
DATED : December 14, 2004
INVENTOR(S) : Baatz et al.

It is certified that error appears in the above-identified patent and that said Letters Patent is hereby corrected as shown below:

Column 22,
Line 54, please delete "the respective picture objects and anew" and insert -- the respective picture objects and $\sigma_{new}$ --.

Signed and Sealed this

Twenty-fourth Day of May, 2005

JON W. DUDAS
*Director of the United States Patent and Trademark Office*